United States Patent [19]

Baumberg

[11] Patent Number: 4,586,527
[45] Date of Patent: May 6, 1986

[54] GAS-PLUG TYPE VALVE

[76] Inventor: Iosif Baumberg, 54 Bay 29 St., Brooklyn, N.Y. 11214

[21] Appl. No.: 605,132

[22] Filed: Apr. 30, 1984

[51] Int. Cl.$^4$ .............................................. F16L 43/00
[52] U.S. Cl. ..................................... 137/139; 137/138
[58] Field of Search ................ 137/132, 136, 138, 139

[56] References Cited

U.S. PATENT DOCUMENTS

| 853,705 | 5/1907 | Lindenberg et al. | 137/138 |
| 1,942,094 | 1/1934 | Gollmar | 137/139 |
| 2,363,313 | 11/1944 | Gavin | 137/132 |
| 4,181,142 | 1/1980 | George | 137/139 |

FOREIGN PATENT DOCUMENTS 455988  6/1913  France ................................ 137/136

Primary Examiner—A. Michael Chambers
Attorney, Agent, or Firm—Ilya Zborovsky

[57] ABSTRACT

A gas-plug type valve has a capillary pipe for introduction of pneumatic starting control signals, a further pipe for introduction of pneumatic locking control signals, and a through-flow pipe connected with these pipes and having four straight sections and three curves which connect the sections with one another, wherein the capillary pipe is connected with a medium curve, and the further pipe is connected with the through-flow pipe in the region between an outer curve closer to an inlet end and the medium curve.

1 Claim, 7 Drawing Figures

GAS-PLUG TYPE VALVE

BACKGROUND OF THE INVENTION

The present invention relates to a gas-plug type valve which controls in an analogous or discrete mode the speed of liquid flowing through pipelines. It can be used for formation of bistable hydraulic elements of discrete action, such as fixed action relay members.

Various designs of pipeline valves and plug valves in a wide range of flow rate, as well as hydraulic bistable elements of discrete action are known in the art. The latter operate hydraulically or pneumatically without movable mechanical parts. The disadvantages of the valve for regulating the flow rate in analogous mode is that they have movable parts, working mechanisms with manual or other (electromechanical, pneumatic, hydraulic) drive which are subjected to wear of their sealing means. The disadvantage of the known pneumatic or hydraulic bistable memory device of discrete action which do not have movable parts is that there are no elements with only one output. The known elements are switching elements, however they cannot perform the operation of turning off.

SUMMARY OF THE INVENTION

Accordingly, it is an object of the present invention to provide a valve which avouds the disadvantages of the prior art.

In keeping with these objects and with others which will become apparent hereinafter, one features of the present invention resides, briefly stated, in a valve which has a capillary pipe for introduction of pneumatic starting control signals, a further pipe for introduction of pneumatic locking control signals, and a through-flow pipe connected with said pipes and having four substantially vertical straight sections and three curves connecting the sections with another another and including two downwardly convex outer curves and an upwardly convex medium curve, wherein the capillary pipe is connected with the medium curve and the further pipe is connected with the through-flow pipe in the region between one outer curve which is closer to a liquid inlet and the medium curve.

The through-flow pipe can be capillary over its entire lengths between its inlet and outlet ends, with the exception of the region of its connection with the further pipe.

The capillary pipe is a pipe with an inner diameter d selected so that a portion of gas with a volume $V > 1/6\pi d^3$ introduced into the liquid in a pipe separates the liquid into two non-communicating portions and does not flow upwardly regardless of the position of the pipe axis. For example, a steel or glass pipe is capillary to water when its inner diameter does not exceed 4 mm, and to gasoline if its inner diameter does not exceed 3 mm.

The novel features of the invention are set forth in particular in the appended claims. The invention itself, however, both as to its construction and method of operation will be best understood from the following description of a preferred embodiment, which is accompanied by the following drawing.

DESCRIPTION OF A PREFERRED EMBODIMENT

Figure 1:
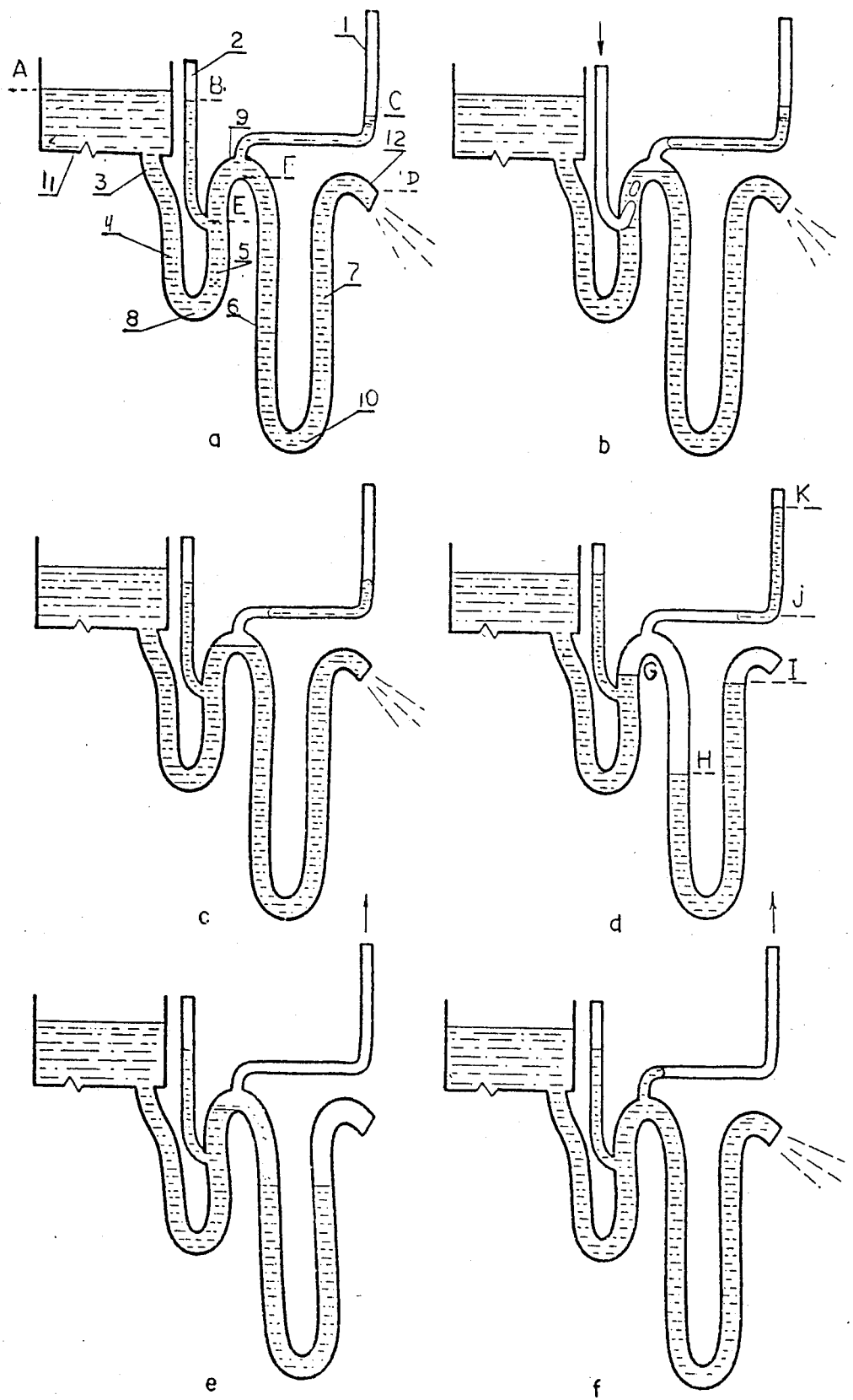
FIG. 1 of the drawing is a view showing a gas-plug type valve in accordance with the present invention, at different stages of its operation.

A valve in accordance with the present invention has a capillary pipe 1 for introduction of control pneumatic starting signals, a pipe 2 for introduction of control pneumatic closing signals, and a flow-through pipe 3.

The flow-though pipe 3 is curved in zig-zag-like manner from its inlet end to its outlet end and includes four rectilinear sections 4,5,6 and 7 with substantially vertical axes. The flow-through pipe 3 also includes three U-shaped curves 8,9 and 10 between the rectilinear sections 4–7. The first curve 8 and the third curve 10 of the flow-through pipe 3 are located lower than the inpet openings of the flow-through pipe and are convex downwardly. The second medium curve 9 is located substantially at the height of the ends of the flow-through pipe 3 and is convex upwardly.

The capillary pipe 1 forms an input channel for introduction of pneumatic starting signals and is curved at a right angle. A horizontal section of the capillary pipe 1 has an end connected with an upper part of the medium curve 9 of the flow-through-pipe. The other section of the pipe 1 extends vertically above the horizontal section and has an end facing upwardly.

The pipe 2 for introduction of pneumatic locking signals has a lower end connected with the flow-through pipe in the region between the first curve 8 and the medium curve 9. The flow-through pipe has an inlet end connected with a source of a liquid supply, for example a reservoir 11. The flow-through pipe has an outlet end adapted for discharge of the liquid outwardly or into another liquid.

The valve in accordance with the present invention operates in the following manner.

Under the action of a pressure $P_{AD}$ which is equal to the pressure of a liquid column $h_{AD}$ between the level A of the liquid in the reservoir 11 and the level D of the outlet end 12 of the flow-through pipe 3, the liquid flows out of the reservoir 11 through the outlet end of the pipe 3. The liquid surface in the pipe 2 for introduction of locking signals is set at the level B, and the liquid surface in the pipe 1 for introduction of starting signals is set at the level C, with some correction by the value of excess capillary pressure, as shown in the position a. If a locking signal is supplied into the upper end of the pipe 2 in form of a gas source with a pressure $P > P_{AE}$ wherein $P_{AE}$ is a pressure of a liquid column with the height $h_{AE}$ between the levels A and E (E is a level of connection of the pipe 2 with the pipe 3), then in the initial period of action of the input locking signal the liquid from the pipe 2 is pressed into the pipe 3 and after this the gas starts to pass into the pipe 3. The gas flows upwardly in the liquid and is accumulated in the medium curve 9 of the through-flow pipe 3 and thereby reduce the inner cross section of the latter for the liquid, as shown in the position b. After turning off of the pneumatic signal or interruption of the gas introduction into the flow-though pipe 3, the liquid raises along the pipe 2 and the gas which has been introduced remains in the pipe 3 so as to form in the latter a stable gas plug, as shown in the position c. In dependence upon the quantity of the introduced gas, the volume of the gas plug and therefore the value of the flow cross section for the liquid in the flow-through pipe can be changed. Thus the value of the flow cross-section is changeable in dependence upon the locking pneumatic signal. If the introduced gas has a volume which is greater than the inner volume of the medium curve 9 limited from below by a horizontal plane extending through the inner lower level F of the curve, then the liquid in the flow-through pipe 3 is separated by the gas plug into two parts. With the increase of the gas volume the liquid surface in the vertical section 5 of the pipe 3 lowers to the level G located between the levels E and F, in the vertical section 6 of the pipe 3 the liquid surface lowers to the level H, and in the vertical section 7 the liquid surface lowers to the level D, as shown in the position d. In the stationary locked condition of the valve the height difference between the above-mentioned liquid level must satisfy the condition $$h_{AG} = h_{IH},$$

wherein;

$h_{AG}$—is a value of height difference between the points A and G, $h_{IH}$—is a value of height difference between the points I and H.

In accordance with the change of the gas quantity and gas pressure in the through-flow pipe 3, the level of the liquid surface in the pipes for introduction of pneumatic control signals 1 and 2. If in case of complete absence of the gas plug in the flow-through pipe 3 (the position a) corresponding to the completely open flow cross section of the latter, the following condition for the heights in the pipes is satisfied $$h_A > h_B > h_C,$$

wherein $h_A$—is a height of the liquid level in the reservoir 11, $h_B$—is a height of the liquid level in the pipe 2, $h_C$—is a height of the liquid level in the pipe 1 (with a correction for an excess capillary pressure), then with the completely closed flow cross section under the condition $h_{AG} = h_{IH}$ the liquid surface in the pipe 2 reaches the liquid level A in the reservoir 11, and the liquid surface in the pipe 1 reaches the level K in which the following condition is satisfied $$h_{AG} = h_{IH} = h_{Kj},$$

wherein j—is a height of the level of the horizontal section of the capillary pipe 1 for introduction of starting control signals (the position d).

In the intermediate conditions between the completely opened and completely closed gas plug-type valve of the invention, the liquid level in the pipe 1 changes between the levels C and K, and the liquid level in the pipe 2 changes between the levels B and A, with the exception of the time interval of the action of locking signals (transitional process).

For transferring the valve from the closed condition to a flow-through condition, a pneumatic starting signal is supplied through the upper end of the pipe 1 and the liquid is pressed out of the latter into the pipe 3 by supply of a pressure impulse. The liquid from the pipe 1 can also be removed by rarification or suction. After removal of the liquid from the pipe 1, the gas passes through the pipe 1 because of the liquid pressure from the side of the reservoir 11 and from the side of the outlet part of the pipe 3, and discharges into a surrounding space, as shown in the position e. The valve is transferred to a condition with a flow cross section completely released from the gas, as shown in the position f. After the release of the through-flow pipe 3 from the gas plug, the liquid raises into the pipe 1 for introduction of starting signals to the level C and thereby the valve is transferred into an unlocked or conducting condition. The above described valve thus operates to regulating the speed of the flow rate of the liquid flowing through a pipeline.

Figure 2:
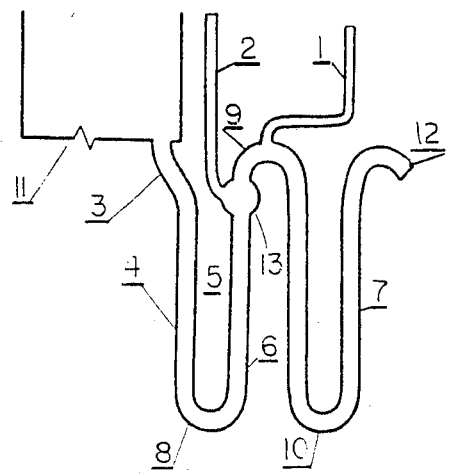
FIG. 2 is a view showing another embodiment of the inventive gas-plug type valve.

A valve of the invention can also perform the functions of a bistable element with two inputs and one output. In this case the through-flow pipe over it entire length from the inlet end to the outlet end, with the exception of the section of connection of the latter with the pipe of introduction of locking pneumatic signals, is formed as a capillary pipe relative to a liquid to be used. The above mentioned connecting section is formed as a cylindrical or spherical expanded portion 13 with an inner diameter preventing a capillary phenomenon as shown in FIG. 2. In this valve liquid passes from the reservoir through the capillary pipe 3 and flows out from its outlet end. After supply of a locking pneumatic signal through the upper end of the pipe 2 the liquid is pressed out from the latter through the expanded section into the capillary pipe 3, and then the gas starts to pass into the capillary pipe in direction from the greater pressure to the lower pressure of liquid and toward the outlet end of the device. In the section with non-capillary properties the gas flows upwardly, but in the capillary pipe the gas does not flow upwardly but instead a transitional front with a meniscus is formed. It displaces with the increase of the quantity of the introduced gas toward the outlet end. After the end of the action of input locking signal, since the non capillary section of connection of the pipes 2 and 3 is filled with the liquid, the liquid raises into the pipe 2 and the residual condition is fixed when the liquid pressure onto the thus formed gas plug from the inlet side and from the outlet side is equalized in the capillary through-flow pipe.

The invention is not limited to the details shown since various modifications and structural changes are possible without departing in any way from the spirit of the present invention.

What is desired to be protected by Letters Patent is set forth in particular in the appended claims.

I claim:

1. A valve, comprising
   a flow-through pipe having inlet and outlet ends for flowing a liquid from the former to the latter, four substantially rectilinear pipe sections with substantially vertical axes, and three U-shaped curved interconnecting pipe sections connecting said substantially rectilinear sections with one another and including two outer curved interconnecting pipe sections spaced horizontally from one another and having a downward convexity and a middle interconnecting pipe section having an upward convexity;
   a pipe for introducing locking pneumatic control signals having an upper end which is open for introducing said locking pneumatic control signals into the same, and a lower end which is connected with said flow-through pipe in a point located somewhat lower than an uppermost point of said middle interconnecting pipe section so that when a locking pneumatic control signal in form of a portion of gas is supplied through said pipe for introducing locking pneumatic control signals into said flow-through pipe the portion of gas which forms said locking pneumatic control signal is located in said middle interconnecting pipe section so as to reduce or interrupt a flow of liquid through the valve and is separated from said lower end by the liquid for preventing a backflow of the gas portion into said pipe for introducing locking pneumatic control signals after termination of supply of the locking pneumatic control signal in form of the portion of gas; and a pipe for introducing starting pneumatic control signals and having an upper end which is open for introducing said starting pneumatic control signals into the same, and a lower end which is connected with the uppermost point of said middle curved interconnecting pipe section so that the gas portion located in said middle curved interconnecting pipe section can be removed from said middle curved interconnecting pipe section under the action of said starting pneumatic control signal and therefore the liquid can again resume its initial flow through the valve, said pipe for interconnecting said starting oneumatic control signals being capillary pipe so that the liquid does not flow out of said pipe for introducing starting pneumatic control signals when the gas portion is present in said middle curved interconnecting pipe section, and said pipe for introducing starting pneumatic control signal having a a horizontal pipe portion for preserving a portion of liquid therein and closing the gas portion in said middle curved interconnecting pipe section from above by the portion of liquid, and a vertical pipe portion for producing a liquid pressure preventing emptying of said pipe fpr introducing starting pneumatic control signals from the liquid during pressure increase of the gas in said flow-through pipe.

* * * * *